United States Patent
Kim

(10) Patent No.: US 8,665,533 B2
(45) Date of Patent: Mar. 4, 2014

(54) ZOOM LENS AND OPTICAL IMAGING DEVICE INCLUDING THE SAME

(75) Inventor: Jin-woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 12/830,572

(22) Filed: Jul. 6, 2010

(65) Prior Publication Data

US 2011/0007404 A1 Jan. 13, 2011

(30) Foreign Application Priority Data

Jul. 7, 2009 (KR) ........................ 10-2009-0061726

(51) Int. Cl.
*G02B 15/14* (2006.01)
*G02B 13/18* (2006.01)
*G02B 3/02* (2006.01)

(52) U.S. Cl.
USPC ............................ 359/689; 359/716; 359/676

(58) Field of Classification Search
USPC .......... 359/676, 684, 689, 680, 682, 716, 715
See application file for complete search history.

(56) References Cited

U.S. PATENT DOCUMENTS

| | | |
|---|---|---|
| 2003/0169508 A1 | 9/2003 | Ori |
| 2004/0257671 A1 | 12/2004 | Kim et al. |
| 2005/0207023 A1 | 9/2005 | Suzuki |
| 2005/0231817 A1 | 10/2005 | Matsusaka et al. |
| 2006/0082900 A1 | 4/2006 | Sugiyama et al. |
| 2006/0245075 A1* | 11/2006 | Lee ................................. 359/680 |
| 2007/0002462 A1* | 1/2007 | Mitsuki ......................... 359/689 |
| 2009/0034067 A1 | 2/2009 | Katakura |
| 2009/0257132 A1* | 10/2009 | Hayakawa et al. ........... 359/689 |
| 2010/0277810 A1* | 11/2010 | Shyu .............................. 359/682 |

FOREIGN PATENT DOCUMENTS

| | | |
|---|---|---|
| JP | 2003-021783 A | 1/2003 |
| JP | 2003-228002 A | 8/2003 |
| JP | 2004-205813 A | 7/2004 |
| JP | 2004-258235 A | 9/2004 |
| JP | 2005-275280 A | 10/2005 |
| JP | 2005-292403 A | 10/2005 |
| JP | 2006-119192 A | 5/2006 |
| JP | 2006-119193 A | 5/2006 |
| JP | 2006-139197 A | 6/2006 |
| JP | 2006-145744 A | 6/2006 |
| JP | 2006-201492 A | 8/2006 |
| JP | 2008-076584 A | 4/2008 |
| JP | 2009-037125 A | 2/2009 |
| KR | 10-2005-0038124 A | 4/2005 |

OTHER PUBLICATIONS

Office Action established for CN 201010224904.4 (Nov. 11, 2013).

* cited by examiner

*Primary Examiner* — Alicia M Harrington
(74) *Attorney, Agent, or Firm* — Drinker Biddle & Reath LLP

(57) ABSTRACT

A zoom lens and an imaging optical device including the same, the zoom lens including, sequentially from an object side, a first lens group having a negative refractive power, a second lens group having a positive refractive power, and a third lens group having a positive refractive power, wherein the first lens group includes a spherical negative lens and an aspherical positive lens and the second lens group includes a positive lens and a negative lens, the positive lens and the negative lens including three or more aspherical surfaces.

16 Claims, 7 Drawing Sheets

ZOOM LENS AND OPTICAL IMAGING DEVICE INCLUDING THE SAME

CROSS-REFERENCE TO RELATED PATENT APPLICATION

This application claims the benefit of Korean Patent Application No. 10-2009-0061726, filed on Jul. 7, 2009, in the Korean Intellectual Property Office, the disclosure of which is incorporated herein in its entirety by reference.

BACKGROUND OF THE INVENTION

1. Field of the Invention

The invention relates to a zoom lens and an optical imaging device including the same.

2. Description of the Related Art

Digital still cameras (DSCs) including a solid state imaging device such as a charge coupled device (CCD) or a complementary metal-oxide semiconductor (CMOS), or digital video cameras (DVCs) are widely used. In particular, demands for camera modules with mega-pixel resolution have increased, and cameras having picture resolution higher than 5 million pixels are frequently employed. Optical imaging devices such as digital still cameras (DSCs) using a CCD or a CMOS, or mobile phone cameras are required to have small size, light weight, and low manufacturing costs.

In order to meet the demands for camera miniaturization, when photographing is performed, a lens is extended from or retracted into a main camera body in a predetermined position, and when photographing is not performed, a collapsible lens barrel that is accommodated in the camera and is driven to arrange lenses along an optical axis has been widely used. In such a collapsible camera, when the collapsible lens barrel is accommodated in the camera, a distance between lens groups must be minimized so that the thickness of a camera can be decreased and portability of the camera can be improved. In the collapsible lens barrel, the number of lens groups must be decreased in order to manufacture a small-sized and thin camera. In this case, excellent picture resolution needs to be ensured.

In order to satisfy these demands, a conventional zoom lens including three lens groups has been widely used. Also, a conventional zoom lens system including a small-sized photographing lens system having 2× zoom ratio has been introduced. In the conventional zoom lens including three lens groups, the first lens group has a negative refractive power, the second lens group has a positive refractive power as a whole, and the third lens group has a positive refractive power, and the three lens groups are sequentially arranged from an object side to an image side of the conventional zoom lens. However, with such a conventional lens it is difficult to satisfy the demands for miniaturization and low lens manufacturing costs and also achieve a high zooming rate.

SUMMARY OF THE INVENTION

The invention provides a zoom lens that may be small-sized and may be manufactured with low manufacturing costs, and an optical imaging device including the same.

According to an embodiment of the invention, there is provided a zoom lens including, sequentially from an object side, a first lens group having a negative refractive power, a second lens group having a positive refractive power, and a third lens group having a positive refractive power, wherein the first lens group includes a spherical negative lens and an aspherical positive lens and the second lens group includes a positive lens and a negative lens, the positive lens and the negative lens including three or more aspherical surfaces.

According to another embodiment of the invention, there is provided a zoom lens, including sequentially from an object side, a first lens group having a negative refractive power, a second lens group having a positive refractive power, and a third lens group having a positive refractive power, wherein the first lens group includes two lenses, and the second lens group includes an aspherical positive lens and an aspherical negative lens, and the third lens group includes at least one spherical lens having a refractive power that satisfies the following Equation:

$$3nd > 1.8,$$

where $3nd$ is a refractive index of at least one spherical lens of the third lens group.

The zoom lens may satisfy the following Equation:

$$16 < 21vd - 22vd < 26,$$

where $21vd$ is an Abbe's number of a positive lens of the second lens group, and $22vd$ is an Abbe's number of a negative lens of the second lens group.

The second lens group may correct optical handshake.

All lenses that belong to the first lens group, the second lens group, and the third lens group may include glass.

The negative lens of the second lens group may be convex towards the object side.

The third lens group may include a positive biconvex lens.

All of the first lens group, the second lens group, and the third lens group may be moveable along an optical axis while zooming.

According to another embodiment of the invention, there is provided an optical imaging device including: a zoom lens; and an imaging sensor receiving an image formed by the zoom lens, wherein the zoom lens includes, sequentially from an object side, a first lens group having a negative refractive power, a second lens group having a positive refractive power, and a third lens group having a positive refractive power and wherein the first lens group includes a spherical negative lens and an aspherical positive lens and the second lens group includes a positive lens and a negative lens, the positive lens and the negative lens including three or more aspherical surfaces.

According to another embodiment of the invention, there is provided an optical imaging device including: a zoom lens; and an imaging sensor receiving an image formed by the zoom lens, wherein the zoom lens includes sequentially from an object side a first lens group having a negative refractive power, a second lens group having a positive refractive power, and a third lens group having a positive refractive power, and the first lens group includes two lenses, and the second lens group includes an aspherical positive lens and an aspherical negative lens, and the third lens group includes at least one spherical lens having a refractive power that satisfies the following Equation:

$$3nd > 1.8,$$

where $3nd$ is a refractive index of at least one spherical lens of the third lens group.

BRIEF DESCRIPTION OF THE DRAWINGS

The above and other features and advantages of the invention will become more apparent by the following detailed description of exemplary embodiments thereof with reference to the attached drawings in which.

DETAILED DESCRIPTION OF THE INVENTION

Figure 1:
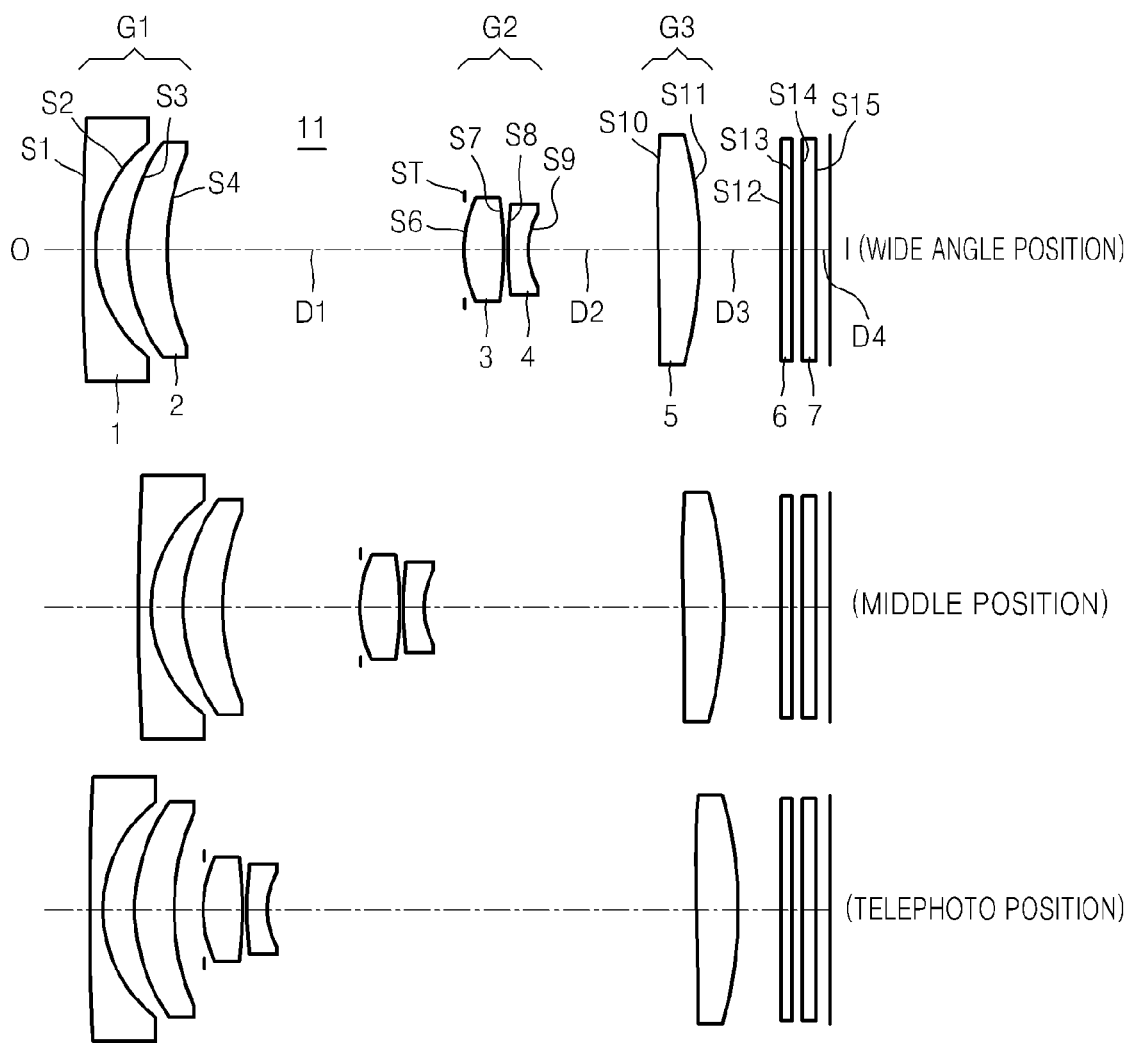
FIG. 1 is a cross-sectional view of a zoom lens at a wide angle position, a middle position, and a telephoto position, respectively, according to an embodiment of the invention.

The attached drawings for illustrating exemplary embodiments of the invention are referred to in order to gain a sufficient understanding of the invention, the merits thereof, and the objectives accomplished by the implementation of the invention. Hereinafter, various embodiments of the invention will be described in detail with reference to the attached drawings. Like reference numerals in the drawings denote like elements.

FIG. 1 is a cross-sectional view of a zoom lens 11 at a wide angle position, a middle position, and a telephoto position, respectively, according to an embodiment of the invention. Referring to FIG. 1, the zoom lens 11 according to the current embodiment includes a first lens group G1 having a negative refractive power, a second lens group G2 having a positive refractive power, and a third lens group G3 having a positive refractive power, which are sequentially arranged from an object side O to an image side I of the zoom lens 11. The first lens group G1 may include a first lens 1 and a second lens 2. The first lens 1 may have a negative refractive power, and the second lens 2 may have a positive refractive power. The first lens 1 is a spherical lens, and the second lens 2 is an aspherical lens.

The second lens group G2 may include a third lens 3 having a positive refractive power and a fourth lens 4 having a negative refractive power. The fourth lens 4 may be convex towards the object side O. A stop ST may be disposed at the object side O of the second lens group G2. The third lens 3 and the fourth lens 4 may be aspherical lenses. For example, the third lens 3 and the fourth lens 4 may include three or more aspherical surfaces and correct aberration that occurs during a zooming operation. The second lens group G2 may include two lenses having a positive refractive power and a negative refractive power, respectively, so that chromatic aberration may be easily controlled.

The first lens group G1 affects the viewing angle and diffraction and resolution of the zoom lens 11 at the wide angle position. The second lens group G2 is related to the zooming rate, and the greater the refractive power of the second lens group G2, the greater the moving range of the second lens group G2 during zooming. The third lens group G3 corrects a variation of an image plane caused by a variation of an object distance, thereby performing focusing. In order to miniaturize the zoom lens 11 of FIG. 1, the number of lenses needs to be minimized, and also a trajectory of a lens during the zooming needs to be minimized. However, there is a limitation in minimizing the number of lenses or in minimizing the trajectory of the lens. In particular, when the number of lenses is decreased, sensitivity with respect to the lenses is increased, and thus the number of aspherical lenses needs to be increased, and when the number of aspherical lenses is increased, lens manufacturing costs increase. Thus, better aberration and a better optical performance are achieved without reducing the number of lenses by using an aspherical lens as a positive lens of the first lens group G1. By using a negative lens of the first lens group G1 as a spherical lens, the sum of thicknesses of lenses that belong to the first lens group G1 may be reduced as compared to a case where the negative lens of the first lens group G1 is used as an aspherical lens. A diameter of the negative lens of the first lens group G1 is greater than a diameter of the positive lens of the first lens group G1. In other words, by using a positive lens having a small diameter as an aspherical lens rather than by using a negative lens having a large diameter as an aspherical lens, the sum of thicknesses of lenses may be reduced. Also, when an aspherical lens is manufactured using a mold, a positive lens having a small diameter is used as the aspherical lens, and thus productivity may be improved.

Meanwhile, the third lens group G3 of the zoom lens 11 of FIG. 1 may include at least one lens having a refractive index that satisfies the following Equation 1:

$$3nd > 1.8, \quad (1)$$

where 3nd is the refractive index of at least one spherical lens of the third lens group G3. For example, the third lens group G3 may include a fifth lens 5, and the fifth lens 5 may be a spherical lens. The fifth lens 5 has a high refractive index of 1.8 or more so that a proper amount of peripheral light may be obtained, an excellent optical performance may be obtained, and a thickness of the third lens group G3 and an overall length of the zoom lens 11 may be reduced. As a result, the lens barrel may be made slim.

The fifth lens 5 may be a positive biconvex lens. When each of lenses of the third lens group G3 is a meniscus lens, the space at a concave surface of the meniscus lens may be reduced, and an overall length at which the lens barrel is extended from or retracted into a main camera body may be reduced too. In other words, the concave surface of the meniscus lens forms a dead space, and thus, if each lens of the third lens group G3 is a meniscus lens, miniaturization of the zoom lens 11 of FIG. 1 cannot be achieved. Thus, the lens of the third lens group G3 may be a positive convex lens for miniaturization purposes.

Two filters 6 and 7 may be disposed on the image side I of the third lens group G3.

Meanwhile, the second lens group G2 may satisfy the following Equation 2:

$$16 < 21vd - 22vd < 26, \quad (2)$$

where 21vd is an Abbe's number of a positive lens of the second lens group G2, and 22vd is an Abbe's number of a negative lens of the second lens group G2.

When the Abbe's number of each of the positive lens and the negative lens of the second lens group G2 satisfies the following Equation 2, chromatic aberration may be controlled. When the Abbe's number of each of the positive lens and the negative lens of the second lens group G2 is out of the range defined by Equation 2, color aberration is increased.

The second lens group G2 in the zoom lens 11 of FIG. 1 corrects image shake caused by hand shake. In order to correct image shake, the second lens group G2 is shifted in a direction perpendicular to the optical axis. In order to correct image shake, when the second lens group G2 is shifted, the quality of an image needs to be good, and the spherical aberration and the Petzval sum of the zoom lens 11 need to be properly corrected. In this case, spherical aberration and eccentric coma aberration that occur in a central portion of a screen when the second lens group G2 is shifted in the direction perpendicular to the optical axis may be suppressed. By correcting the Petzval sum of the zoom lens 11, curvature of the image plane that is formed at a circumferential portion of the screen when the second lens group G2 is shifted in the direction perpendicular to the optical axis may be suppressed.

All lenses that are included in the zoom lens 11 of FIG. 1 may be formed using only glass. When all lenses of the zoom lens 11 of FIG. 11 are formed of plastics, lens manufacturing costs may be reduced. However, the number of lenses is small, and thus sensitivity of the lenses may be increased. Thus, when plastic lenses are used in the zoom lens having a small number of lenses, excellent optical performance may be difficult to achieve. In order to improve optical performance, the zoom lens 11 of FIG. 11 may include only glass lenses.

The aspherical shape of the zoom lens 11 of FIG. 11 will now be described. When the optical axis is in an x-axis, a direction perpendicular to the optical axis is a y-axis and a proceeding direction of light is a positive direction, the aspherical shape of the zoom lens 11 of FIG. 1 may be given by Equation 3:

$$x = \frac{cy^2}{1 + \sqrt{1 - (K+1)c^2 y^2}} + Ay^4 + By^6 + Cy^8 + Dy^{10} | \ldots , \quad (3)$$

where x is the distance from the peak portion of a lens to the optical axis, y is the distance from the peak portion of the lens to the direction perpendicular to the optical axis, K is a conic constant, A, B, C, and D are aspherical coefficients, and c is a reverse number 1/R of the radius of curvature at the peak portion of the lens.

In other embodiments, including the following designs, the zoom lens 11 of FIG. 1 may be miniaturized.

Hereinafter, f is the combined focal length of the whole lens system, Fno is the F number, 2ω is the viewing angle, R is the radius of curvature, Dn is the thickness of a central portion of a lens or a distance between lenses, nd is the refractive index, and vd is an Abbe's number, respectively. Also, ST is the aperture stop, and D1, D2, D3, and D4 are variable distances. In the drawings, lenses in a lens group are shown using the same reference numerals.

First Embodiment

FIG. 1 is a cross-sectional view of a zoom lens at a wide angle position, a middle position, and a telephoto position, respectively, according to an embodiment of the invention.

TABLE 1

EFL: 6.50 to 18.48 mm, Fno: 3.10 to 5.91,
Viewing angle: 63.7° to 23.8°

| Lens surface | Radius of curvature (R) | Thickness (Dn) | Refractive index (nd) | Abbe's number (vd) |
|---|---|---|---|---|
| S1 | 92.437 | 0.500 | 1.517 | 52.1 |
| S2 | 4.789 | 1.088 | | |
| S3 | 5.743 | 1.426 | 1.821 | 24.1 |
| S4 | 7.271 | D1 | | |
| ST | infinity | 0.000 | | |
| S6 | 3.898 | 1.396 | 1.768 | 49.2 |
| S7 | −18.813 | 0.110 | | |
| S8 | 8.631 | 0.762 | 1.821 | 24.1 |
| S9 | 2.830 | D2 | | |
| S10 | 200.000 | 1.408 | 1.883 | 40.8 |
| S11 | −14.939 | D3 | | |
| S12 | infinity | 0.300 | 1.517 | 64.2 |
| S13 | infinity | 0.300 | | |
| S14 | infinity | 0.500 | 1.517 | 64.2 |
| S15 | infinity | D4 | | |

The following tables shows the variable distances at which three lens groups of the zoom lens are moveable along the optical axis when a zooming rate is changed from the wide angle position to the telephoto position, according to the present embodiment.

TABLE 2

| Variable distance | Wide angle position | Middle position | Telephoto position |
|---|---|---|---|
| D1 | 10.541 | 4.824 | 0.992 |
| D2 | 4.664 | 9.187 | 15.193 |
| D3 | 2.985 | 2.155 | 1.612 |
| D4 | 0.600 | 0.600 | 0.600 |

The following represents aspherical coefficients according to the present embodiment.

TABLE 3

| Lens surface | K | A | B | C | D |
|---|---|---|---|---|---|
| S3 | −0.690644 | −2.061899E−05 | −6.329558E−06 | −1.533885E−06 | 7.263593E−08 |
| S4 | −9.233583 | 2.151908E−03 | −1.988188E−04 | 7.151402E−06 | −1.177426E−07 |
| S6 | −1.040585 | 8.507990E−04 | −1.052304E−06 | −1.893851E−05 | 0.000000E+00 |
| S8 | 0.711831 | −3.961101E−03 | 5.045714E−04 | 0.000000E+00 | 0.000000E+00 |
| S9 | −1.000000 | 1.642222E−03 | 1.147907E−03 | −4.533634E−05 | 0.000000E+00 |

Figure 2A:
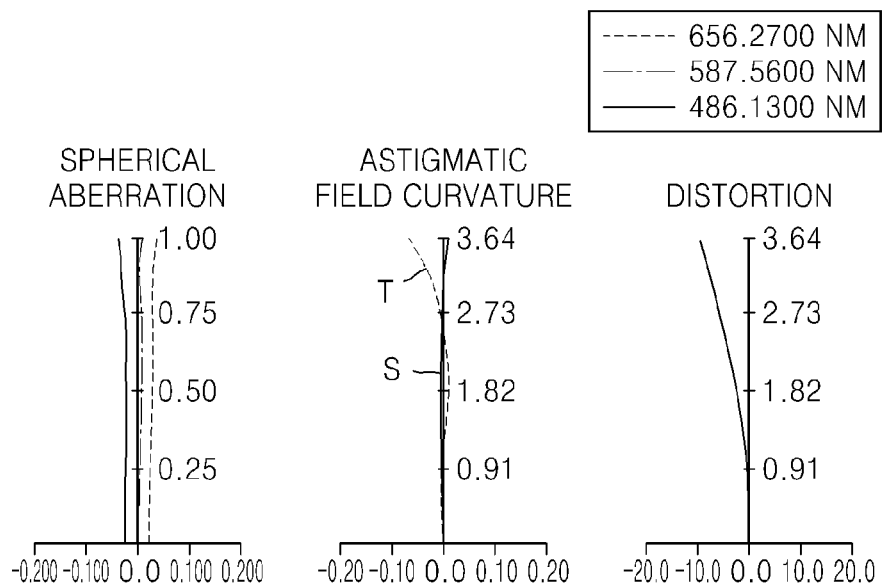
FIG. 2A is a chart of aberration at the wide angle position of the zoom lens of FIG. 1.
Figure 2B:
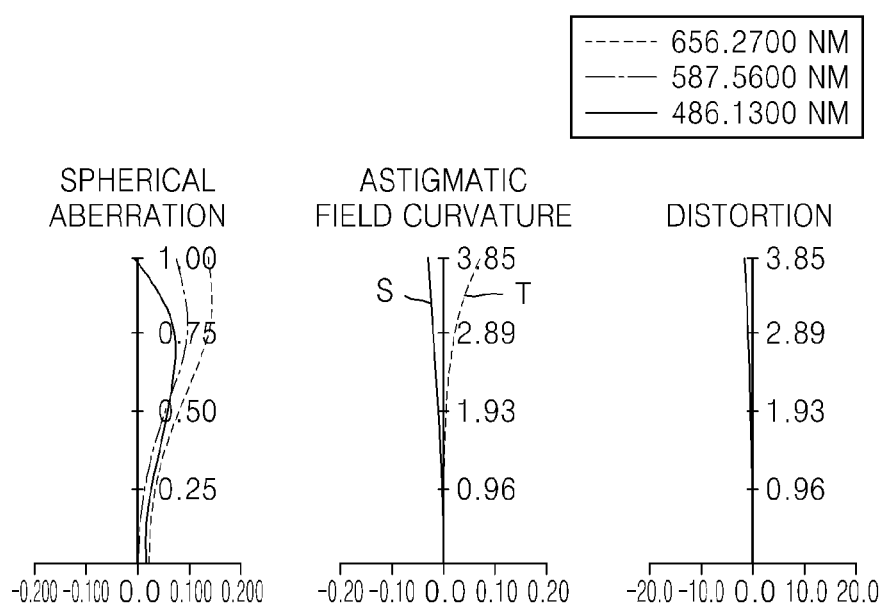
FIG. 2B is a chart of aberration at the telephoto position of the zoom lens of FIG. 1.

FIGS. 2A and 2B illustrate spherical aberration, field curvature, and distortion aberration at the wide angle position and at the telephoto position of the zoom lens of FIG. 1, respectively. Field curvature includes tangential field curvature T and sagittal field curvature S.

Second Embodiment

Figure 3:
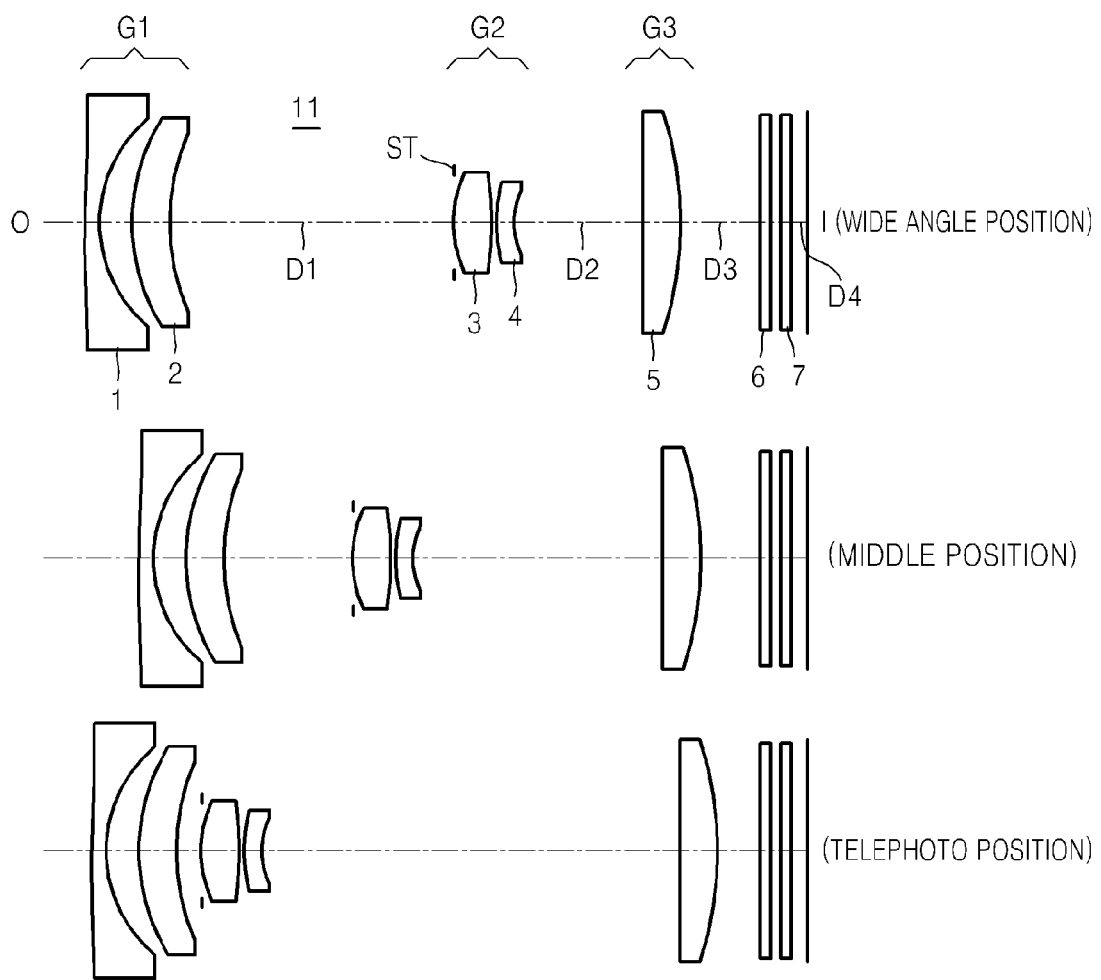
FIG. 3 is a cross-sectional view of a zoom lens at a wide angle position, a middle position, and a telephoto position, respectively, according to another embodiment of the invention.
Figure 4A:
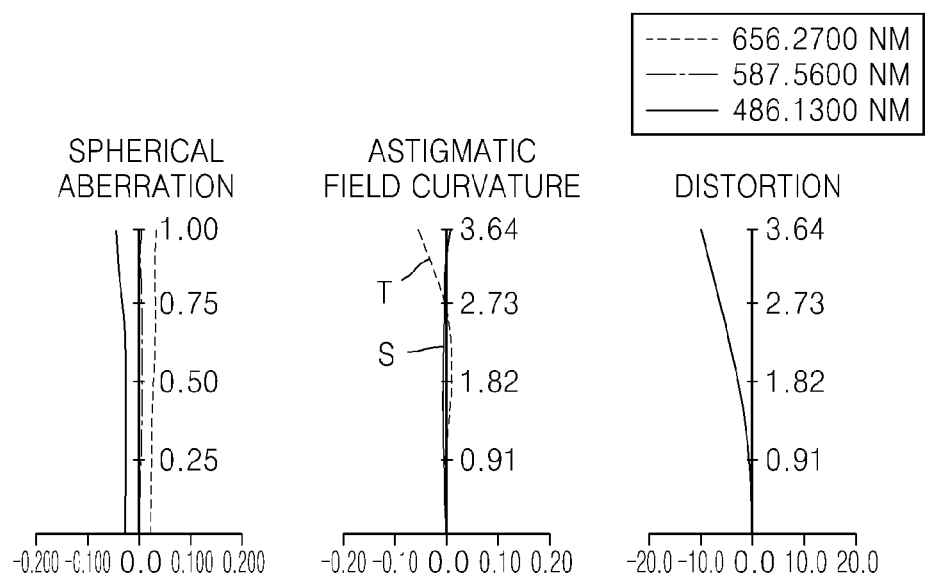
FIG. 4A is a chart of aberration at the wide angle position of the zoom lens of FIG. 4.
Figure 4B:
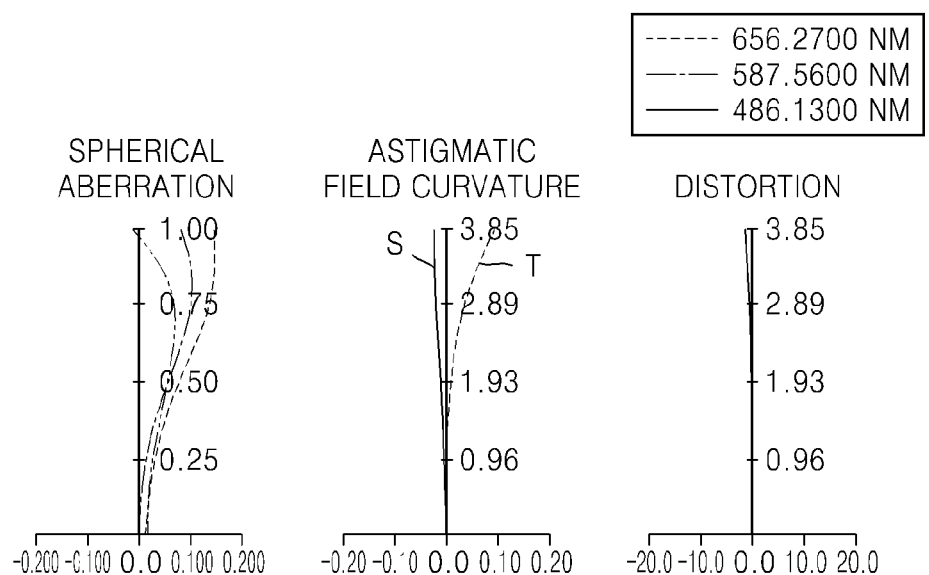
FIG. 4B is a chart of aberration at the telephoto position of the zoom lens of FIG. 4.

FIG. 3 is a cross-sectional view of a zoom lens at the wide angle position, the middle position, and the telephoto position, respectively, according to another embodiment of the invention. The following table shows actual data about the zoom lens of FIG. 3.

TABLE 4

EFL: 6.49 to 18.44 mm, Fno: 3.2 to 6.0, Viewing angle: 63.9° to 23.9°

| Lens surface | Radius of Curvature (R) | Thickness (Dn) | Refractive index (nd) | Abbe's number (vd) |
|---|---|---|---|---|
| S1 | 116.257 | 0.500 | 1.517 | 52.1 |
| S2 | 4.892 | 1.144 | | |
| S3 | 5.798 | 1.411 | 1.821 | 24.1 |
| S4 | 7.251 | D1 | | |
| ST | infinity | 0.000 | | |
| S6 | 3.904 | 1.373 | 1.768 | 49.2 |
| S7 | −18.243 | 0.200 | | |
| S8 | 8.345 | 0.654 | 1.821 | 24.1 |
| S9 | 2.807 | D2 | | |
| S10 | 300.000 | 1.407 | 1.883 | 40.8 |
| S11 | −14.640 | D3 | | |
| S12 | infinity | 0.300 | 1.517 | 64.2 |
| S13 | infinity | 0.300 | | |
| S14 | infinity | 0.500 | 1.517 | 64.2 |
| S15 | infinity | D4 | | |

The following data presents data about variable distances at which the three lens groups of the zoom lens are moveable along the optical axis when the zooming rate is changed from the wide angle position to the telephoto position, according to the present embodiment.

TABLE 5

| Variable distance | Wide angle position | Middle position | Telephoto position |
|---|---|---|---|
| D1 | 10.433 | 4.733 | 0.962 |
| D2 | 4.671 | 9.206 | 15.219 |
| D3 | 2.990 | 2.173 | 1.630 |
| D4 | 0.600 | 0.600 | 0.600 |

The following table shows aspherical coefficients according to the present embodiment.

TABLE 6

| Lens surface | K | A | B | C | D |
|---|---|---|---|---|---|
| S3 | −0.724137 | −5.379161E−05 | −3.002350E−07 | −1.781740E−06 | 9.753703E−08 |
| S4 | −8.779591 | 2.015009E−03 | −1.757522E−04 | 6.151275E−06 | −6.577599E−08 |
| S6 | −1.106201 | 7.136520E−04 | −2.239024E−05 | −1.864413E−05 | 0.000000E+00 |
| S8 | 1.118837 | −4.127844E−03 | 6.558722E−04 | 0.000000E+00 | 0.000000E+00 |
| S9 | −1.000000 | 1.414752E−03 | 1.215779E−03 | −1.505824E−05 | 0.000000E+00 |

Third Embodiment

Figure 5:
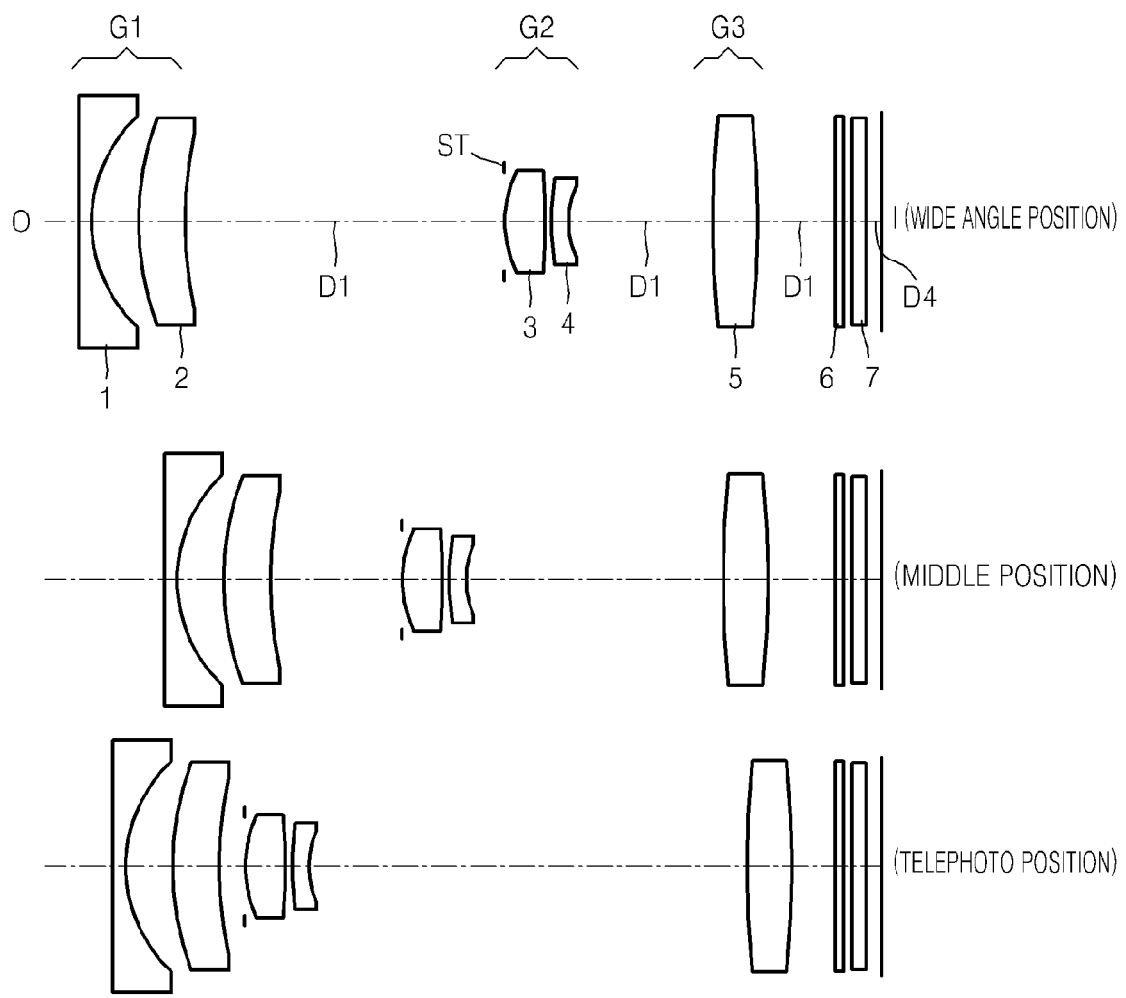
FIG. 5 is a cross-sectional view of a zoom lens at a wide angle position, a middle position, and a telephoto position, respectively, according to another embodiment of the invention.
Figure 6A:
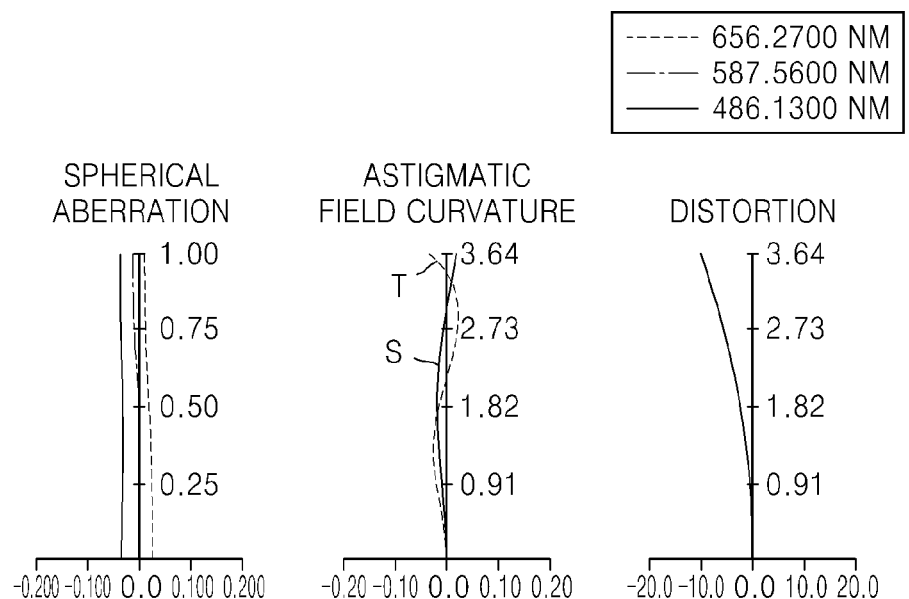
FIG. 6A is a chart of aberration at the wide angle position of the zoom lens of FIG. 5.
Figure 6B:
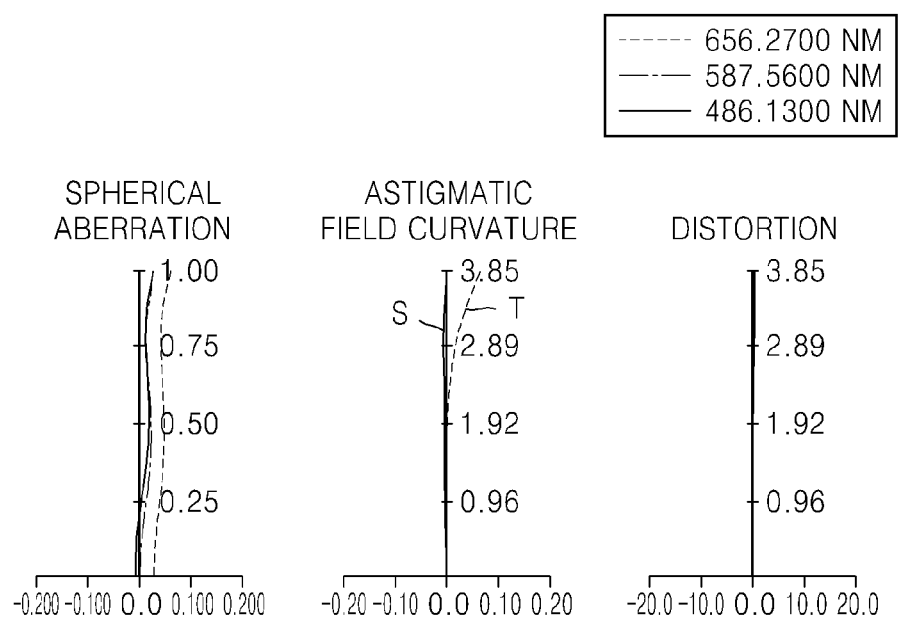
FIG. 6B is a chart of aberration at the telephoto position of the zoom lens of FIG. 5.

FIG. 5 is a cross-sectional view of a zoom lens at the wide angle position, the middle position, and the telephoto position, respectively, according to another embodiment of the invention. The following table presents design data about the zoom lens of FIG. 5.

TABLE 7

EFL: 6.56 to 18.87 mm, Fno: 3.4 to 6.4, Viewing angle: 63.3° to 22.9°

| Lens surface | Radius of curvature (R) | Thickness (Dn) | Refractive index (nd) | Abbe's number (vd) |
|---|---|---|---|---|
| S1 | −753.587 | 0.500 | 1.513 | 70.7 |
| S2 | 5.390 | 1.749 | | |
| S3 | 9.640 | 1.713 | 1.821 | 24.1 |
| S4 | 13.934 | D1 | | |
| ST | infinity | 0.000 | | |
| S6 | 3.903 | 1.573 | 1.755 | 40.4 |
| S7 | −28.822 | 0.200 | | |
| S8 | 10.671 | 0.650 | 1.821 | 24.1 |
| S9 | 3.256 | D2 | | |
| S10 | 45.168 | 1.615 | 2.001 | 25.5 |
| S11 | −39.733 | D3 | | |
| S12 | infinity | 0.300 | 1.517 | 64.2 |
| S13 | infinity | 0.300 | | |
| S14 | infinity | 0.500 | 1.517 | 64.2 |
| S15 | infinity | D4 | | |

The following table presents data about variable distances at which the three lens groups of the zoom lens are moveable along the optical axis when the zooming rate is changed from the wide angle position to the telephoto position, according to the present embodiment.

TABLE 8

| Variable distance | Wide angle position | Middle position | Telephoto position |
|---|---|---|---|
| D1 | 11.943 | 4.937 | 0.882 |
| D2 | 5.433 | 9.701 | 16.358 |
| D3 | 2.952 | 2.482 | 1.648 |
| D4 | 0.600 | 0.600 | 0.600 |

The following table shows aspherical coefficients according to the present embodiment.

TABLE 9

| Lens surface | K | A | B | C | D |
|---|---|---|---|---|---|
| S3 | −0.690659 | 2.135757E−05 | −2.301943E−05 | 7.822465E−07 | −4.538396E−09 |
| S4 | −2.126241 | −2.786926E−04 | −3.334764E−05 | 1.427914E−06 | −2.839117E−08 |
| S6 | −0.705166 | 1.467241E−03 | 7.605664E−05 | −1.743266E−06 | 0.000000E+00 |
| S7 | −10.826915 | 8.508508E−05 | −3.353116E−05 | 5.105271E−07 | 0.000000E+00 |
| S8 | −0.545442 | −6.052017E−03 | 3.109667E−04 | 0.000000E+00 | 0.000000E+00 |
| S9 | −1.000000 | −3.853703E−04 | 7.154881E−04 | 9.064496E−05 | 0.000000E+00 |

The following table shows a case where the first through third embodiments satisfy Equations 1 and 2.

TABLE 10

| Equation | First embodiment | Second embodiment | Third embodiment |
|---|---|---|---|
| Equation 1 | 1.883 | 1.883 | 2.001 |
| Equation 2 | 25.1 | 25.1 | 16.3 |

The zoom lens according to the above-described embodiments has a high zooming rate and may be manufactured to have a small size with low manufacturing costs. Also, the zoom lens according to the above-described embodiments may be used in imaging optical devices such as digital still cameras (DSCs) using a solid state imaging device such as a charge coupled device (CCD) or a complementary metal-oxide semiconductor (CMOS), digital video cameras (DVCs), or mobile phone cameras.

Figure 7:
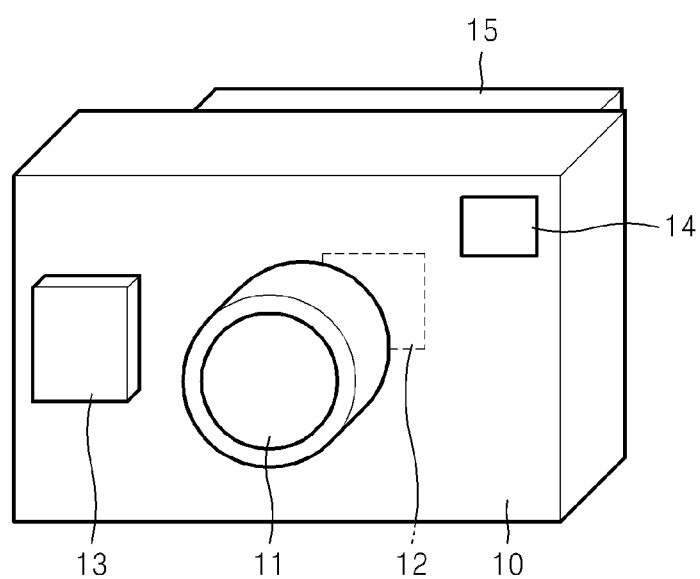
FIG. 7 is a schematic diagram of an optical imaging device including a zoom lens, according to an embodiment of the invention.

FIG. 7 is a schematic diagram of an optical imaging device including a zoom lens, according to an embodiment of the invention. The optical imaging device according to the current embodiment includes a zoom lens identical to the zoom lens 11 described above with respect to FIG. 1, and an imaging sensor 12 that receives light formed by the zoom lens such as 11 of FIG. 1. The imaging sensor 12 may include a solid state imaging device such as a CCD or a CMOS. The optical imaging device may include a recording unit 13 recording information about an image of a subject that is photoelectrically converted by the imaging sensor 12, and a finder 14 that observes the image of the subject. In FIG. 7, the optical imaging device includes the finder 14. The zoom lens of FIG. 1 may also be applied to an optical imaging device with no finder. The optical imaging device of FIG. 7 may further include a liquid crystal display panel 15 on which the image of the subject is displayed. The invention is not limited to this, and the imaging optical device of FIG. 7 may be applied to various optical devices except for cameras. In this way, the zoom lens such as 11 of FIG. 1 is applied to the imaging optical device such as a digital camera so that an optical device that is small-sized and in which an image of a subject is picked up with a wide angle position at a high zooming rate may be implemented.

As described above, the zoom lens according to this embodiment of the invention is useful for miniaturization purposes and reducing the manufacturing costs.

In an embodiment, the zoom lens includes three lens groups, thereby having a small number of lenses. Also, the first lens group of the zoom lens includes an aspherical lens as a positive lens, and thus the thickness of the zoom lens can be reduced. The third lens group of the zoom lens may include a lens having a high refractive index, and thus the overall length of the zoom lens can be reduced so that the zoom lens may be miniaturized.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A zoom lens comprising;
sequentially from an object side, a first lens group having a negative refractive power, a second lens group having a positive refractive power, and a third lens group having a positive refractive power,
wherein the first lens group comprises a spherical negative lens and an aspherical positive lens, and the second lens group consists of a positive lens and a negative lens, the second lens group comprising at least three aspherical surfaces, and
wherein the zoom lens satisfies the following Equation:

$$16 < 21vd - 22vd < 26,$$

where 21vd is an Abbe's number of the positive lens of the second lens group, and 22vd is an Abbe's number of the negative lens of the second lens group, and wherein the second lens group corrects handshake.

2. The zoom lens of claim 1, wherein all lenses that belong to the first lens group, the second lens group, and the third lens group comprise glass.

3. The zoom lens of claim 1, wherein the negative lens of the second lens group is convex towards the object side.

4. The zoom lens of claim 1, wherein the third lens group comprises a positive biconvex lens.

5. The zoom lens of claim 1, wherein all of the first lens group, the second lens group, and the third lens group are moveable along an optical axis while zooming.

6. The zoom lens of claim 1, wherein the third lens group performs focusing according to a variation of object distance.

7. A zoom lens, comprising:
sequentially from an object side, a first lens group having a negative refractive power, a second lens group having a positive refractive power, and a third lens group having a positive refractive power,
wherein the first lens group comprises two lenses, the second lens group consists of an aspherical positive lens and an aspherical negative lens, and the third lens group comprises at least one spherical lens having a refractive power that satisfies the following Equation:

$$3nd > 1.8,$$

where 3nd is the refractive index of the at least one spherical lens of the third lens group.

8. The zoom lens of claim 7, wherein the zoom lens satisfies the following Equation:

$$16 < 21vd - 22vd < 26,$$

where 21vd is an Abbe's number of the positive lens of the second lens group, and 22vd is an Abbe's number of the negative lens of the second lens group.

9. The zoom lens of claim 7, wherein the second lens group corrects optical handshake.

10. The zoom lens of claim 7, wherein all lenses that belong to the first lens group, the second lens group, and the third lens group comprise glass.

11. The zoom lens of claim 7, wherein the negative lens of the second lens group is convex towards the object side.

12. The zoom lens of claim 7, wherein the third lens group comprises a positive biconvex lens.

13. The zoom lens of claim 7, wherein all of the first lens group, the second lens group, and the third lens group are moveable along an optical axis while zooming.

14. An optical imaging device comprising:
a zoom lens; and an imaging sensor receiving an image formed by the zoom lens,
wherein the zoom lens comprises, sequentially from an object side, a first lens group having a negative refractive power, a second lens group having a positive refractive power, and a third lens group having a positive refractive power, and wherein the first lens group comprises a spherical negative lens and an aspherical positive lens, and the second lens group consists of a positive lens and a negative lens, the second lens group comprising at least three aspherical surfaces, and
wherein the zoom lens satisfies the following Equation:

$$16 < 21vd - 22vd < 26,$$

where 21vd is an Abbe's number of the positive lens of the second lens group, and 22vd is an Abbe's number of the negative lens of the second lens group, wherein the second lens group corrects handshake.

15. An optical imaging device comprising:
a zoom lens; and
an imaging sensor receiving an image formed by the zoom lens,
wherein the zoom lens comprises, sequentially from an object side, a first lens group having a negative refractive power, a second lens group having a positive refractive power, and a third lens group having a positive refractive power, and the first lens group comprises two lenses, the second lens group consists of an aspherical positive lens and an aspherical negative lens, and the third lens group comprises at least one spherical lens having a refractive power that satisfies the following Equation:

$$3nd > 1.8,$$

where 3nd is the refractive index of the at least one spherical lens of the third lens group.

16. The imaging optical device of claim 15, wherein the zoom lens satisfies the following Equation:

$$16 < 21vd - 22vd < 26,$$

where 21vd is an Abbe's number of the positive lens of the second lens group, and 22vd is an Abbe's number of the negative lens of the second lens group.

* * * * *